Jan. 29, 1946.  R. J. GOLDIE ET AL  2,393,628
GEAR AND METHOD OF MAKING IT
Filed April 10, 1943  4 Sheets-Sheet 1

Inventors
Rowland J. Goldie
Carl L. Wilber
By Strauch & Hoffman
Attorneys.

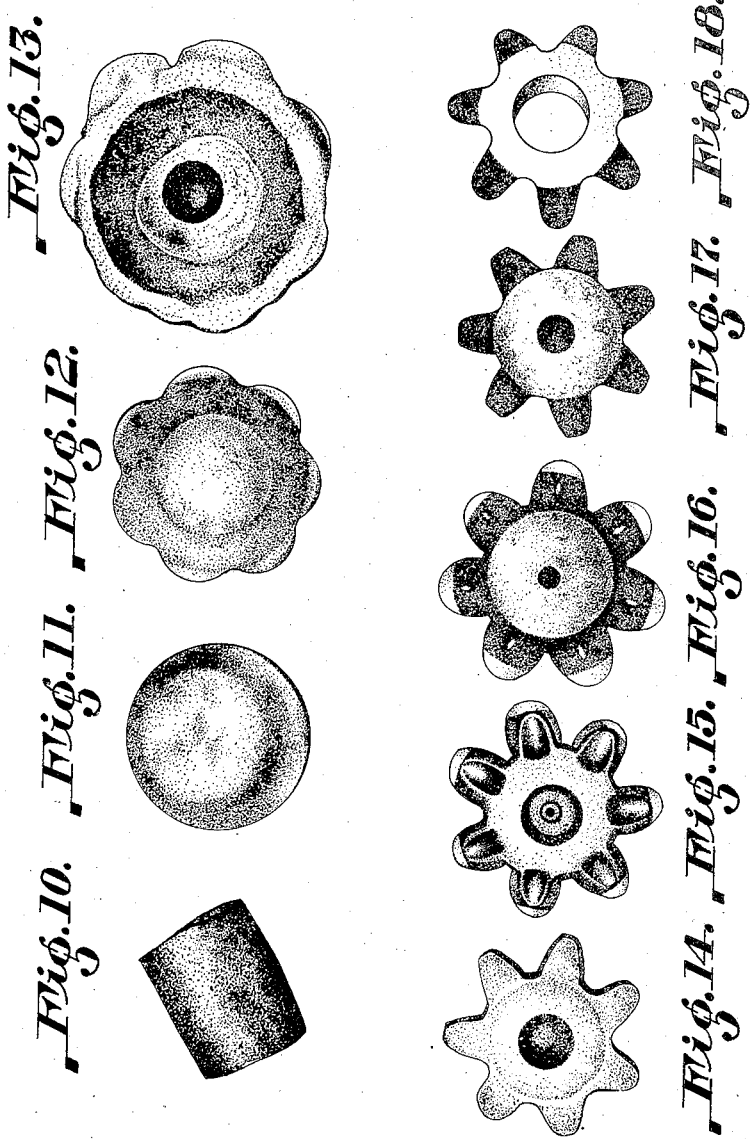

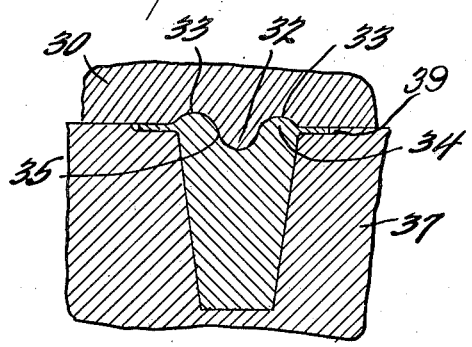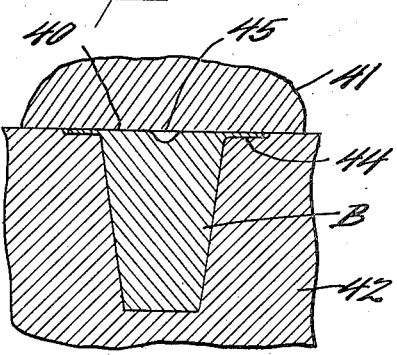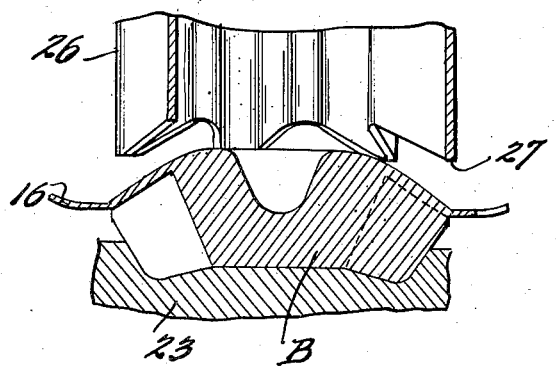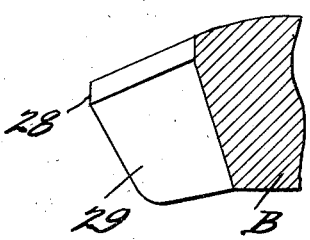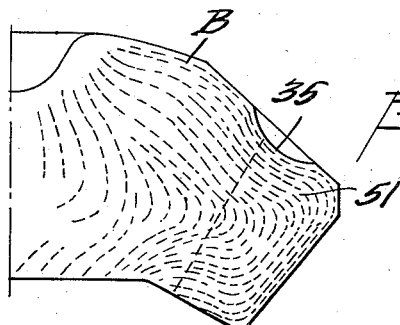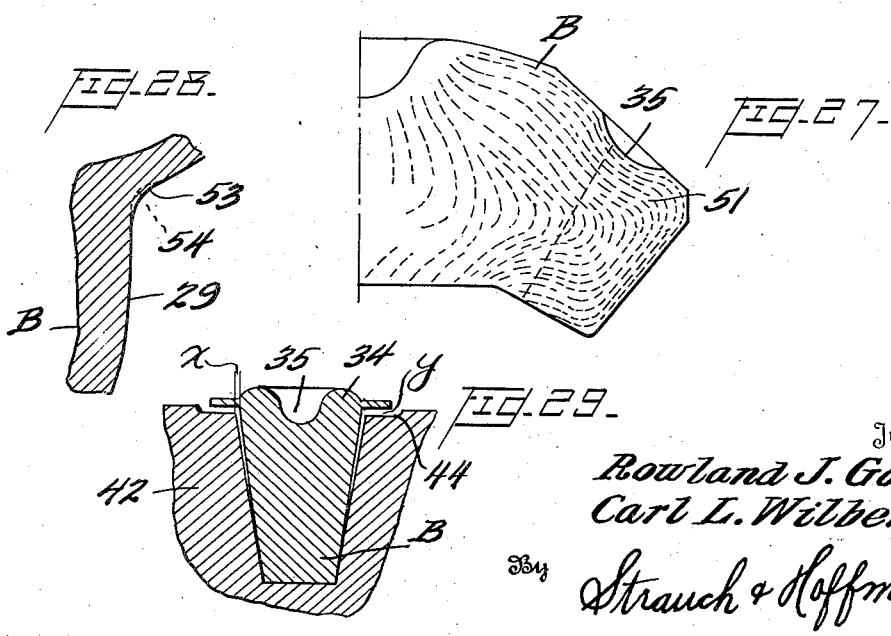

Patented Jan. 29, 1946

2,393,628

UNITED STATES PATENT OFFICE 2,393,628

GEAR AND METHOD OF MAKING IT

Rowland J. Goldie and Carl L. Wilber, Detroit, Mich., assignors to The Timken-Detroit Axle Company, Detroit, Mich., a corporation of Ohio Application April 10, 1943, Serial No. 482,638

5 Claims. (Cl. 74—460)

The present invention relates especially to the production of gears, more particularly bevel gears, by means of a series of die-pressing operations, although certain features of the invention are not limited to the production of bevel gears and may be used in the forging of other types of gears and articles.

Although methods and apparatus have been heretofore proposed for forming gears by die pressing or forging, none of them have proved commercially successful and have not gone into use because they are open to serious disadvantages. The gears produced by such prior proposed methods and apparatus are defective, because the teeth surfaces of the finished gears are not sufficiently dense and strong to provide the degree of wear and fatigue resistance required for successful gear service; the contour or profile of the working surfaces of the teeth are not formed with sufficient accuracy to efficiently mesh with the mating gear without requiring finishing in a costly and time consuming grinding operation; the metal is so worked during die pressing that the fiber of the grain in the steel is distorted or ruptured, with the result that a comparatively low strength gear is produced; or the forging operation does not produce smooth working surfaces, with the result that any surface irregularities thereon produce rapid wear of the meshing gears. Also, in proposed prior forging methods, the apparatus for die pressing gears has not been successful because the dies are likely to split or break when subjected to the heavy pressures necessary to form useful gears; the dies wear out rapidly under the forging pressures, making it necessary to replace them after only a comparatively few gears have been turned out; or a flash is formed at the periphery of the dies, which is of such a nature as to make it both difficult and expensive to remove from the gear.

We have discovered that by carrying out a die-pressing operation upon a blank in a plurality of steps; establishing predetermined temperatures during certain die-pressing steps; cleaning the surfaces of the blank between certain die-pressing steps; so shaping the dies as to gradually bring the blank into the form of the finished gear; re-enforcing the dies to withstand the required forging pressures; so contouring certain dies as to set up a strong densifying action longitudinally of the teeth and effect a transverse flow of the excess metal when the blank is subsequently pressed in a final coin-pressing operation; so trimming the flash from the blank as to locate the trimmed surfaces below the level of the working areas of the gear teeth, and finally cold-pressing the gear teeth in a planishing die, it is possible to rapidly turn out die-pressed gears which may be bored, machined and carburized to provide a dense strong gear having accurately formed, smooth hard tooth surfaces, and in which the flow lines are disposed substantially parallel to the teeth, by a process which effects material economies in cost and amount of metal, over the present day methods of cutting or generating gear pinions from rolled or forged blanks.

A principal object of this invention is to provide a method of die-pressing gears or like articles having exterior surfaces subject to wear and stress that will produce a densification of the metal at and adjacent said surfaces compared to the interior of the gear or article.

Another object of the invention is to provide a method of making a gear by a succession of forging and coin-pressing operations carried out in dies that serve to gradually produce the gear step-by-step from a slug cut from bar stock or the like having only slightly more metal therein than is needed to produce the completed article thus economizing in the use of metal.

Still another object of this invention is to provide a way of forging a gear or like article by a succession of forging and coin-pressing operations carried out in dies shaped to slightly expand the article in cross-dimensions and slightly reduce the article in thickness as the article is brought to final form step-by-step, the extrusion of metal from the dies being controlled in early steps and prevented in later steps, the alteration in cross-dimensions, the diminution in thickness and the control of extrusion from the dies all being effected in such manner as to cause a densification of metal at the surfaces of the article that are subjected to wear, stress and strain.

This invention also aims to provide a method of producing a gear or the like in which the gear is brought into its final pressed shape by a coin-pressing operation on a gear, the back of which was deformed in a previous operation thus causing the creation of great pressures in the final dies of such direction that the external wear surfaces are caused to conform extremely closely to the smooth die surfaces, whereby durable wear surfaces result that require no expensive machining or grinding operations.

It is a further main object of this invention to provide novel methods of die-pressing gears which makes possible the rapid, economical production of hard, dense gears having smooth, accurately contoured tooth surfaces, and greater strength and fatigue resistance than comparable cut or generated gears.

A further object is to provide a method of die-pressing a gear from a blank including the steps of forming the gear by a succession of forging operations and during certain operations causing the metal constituting the back of the gear to flow in directions transverse to the direction of application of pressure to the dies, to thereby cause the metal to conform closely to the die surfaces.

A further object is to provide novel methods for die-pressing a gear to final shape from a blank in a series of forging operations, in which the die in one step is so shaped as to form a rib generally paralleling the form of each gear tooth and a recess within the rib in the back of each gear tooth, and the dies in the succeeding step are so shaped as to flatten the ribs and cause the metal to flow generally in the direction of applied pressure and come into close conformity with the die surfaces, the excess metal flowing transversely into and partially filling up the recesses.

A further object is to provide a method of die-pressing bevel gears in a series of steps between successive sets of dies, in which the toes of the teeth are pressed to final dimension in a semi-coin pressing step and the sides of the teeth are simultaneously pressed so as to give the teeth, intermediate the heel and toe, a chordal cross-section somewhat smaller than the final tooth form, and then pressing the gear to expand the teeth to their full chordal thickness and final contour, by setting up heavy pressures lengthwise of the teeth and causing the metal to flow into intimate engagement with the die surfaces and to also undergo a densifying action adjacent the working surfaces of the teeth.

Another object is to provide a novel method of die-pressing gears in a series of steps between successive sets of dies, in which the teeth are so formed as to join the body of the gear along a comparatively large radius, uniformly contoured fillets, thereby producing a gear in which the teeth are materially stronger than those of generated or cut gears.

Another object is to provide a method of die-pressing bevel gears from steel blanks in a series of forging operations, wherein the flash is formed in one forging step at the heels of the teeth and the flash is then trimmed off to provide bevel surfaces disposed substantially parallel to the gear axis, and the blank is so worked in a succeeding pressing step as to cause the metal below the bevel surface to flow out between the dies and develop a further flash, which is cut off to provide bevel surfaces paralleling the gear axis and intersecting the gear tooth surfaces adjacent the backs of the teeth.

A further object is to provide a method of die-pressing gears from a blank by successively forging the blank and finally coin-pressing it to develop the ultimate gear tooth form, and then subjecting the coin-pressed gear to a planishing action in a die having surfaces conforming exactly to the desired form of gear teeth, under pressures sufficiently high to smooth out any surface imperfections, thereby eliminating the necessity of grinding or cutting the tooth surfaces.

Our invention further aims to provide a novel method of die-pressing a gear into substantially finished form from a length of commercial bar stock, in which the bar is upset by longitudinally applied pressures to first form a slug and then a pancake-shaped blank; then rough and finish forging the blank to the approximate form of the gear; trimming off the flash in a single die moving longitudinally of the gear axis; then subjecting the blank to a further forging operation in which the back of the gear is pressed into the form of raised portions and depressions; and finally pressing the blank between a die shaped to bring the gear tooth surfaces into final form and a die operable to flatten out the raised portions and cause the metal to flow transversely of the direction of applied pressure and partially fill up the depressions.

A further object is to provide a novel forged gear of increased density and strength and of improved flow line structure and fatigue resistance.

Further objects will become apparent as the specification proceeds in conjunction with the annexed drawings, and from the appended claims.

In the drawings:

Figures 10, 11, 12, 13, 14, 15, 16, 17 and 18 are photographic views of the rear sides of the blanks shown in Figures 1, 2, 3, 4, 5, 6, 7, 8 and 9 respectively.

Figure 23 is a transverse sectional view taken on the line 23—23 of Figure 21, on an enlarged scale, showing the depression in the base of the tooth and the associated rib or bead.

Figure 24 is a view similar to Figure 23, but is taken along the line 24—24 of Figure 22 and illustrates how the coining dies bring the teeth into final shape.

Figure 25 is a vertical sectional view showing the cold trimming die and the manner in which it cooperates with the blank.

Figure 26 is an enlarged fragmental sectional view of the gear as it appears after the cold-trimming operation.

Figure 27 is a vertical sectional view, on an enlarged scale, of the gear shown in Figures 6 and 15, illustrating the flow line structure and also indicating the increased density of the metal adjacent the gear teeth.

Figure 28 is an enlarged fragmental sectional view of a gear produced by the method of the invention and also shows, in dotted lines, the profile of a conventional gear, and Figure 29 is a view similar to Figures 23 and 24 but shows the semi-coin-pressed gear blank of Figure 23 positioned in the bottom die of Figure 24, prior to final coin-pressing.

Figure 1:
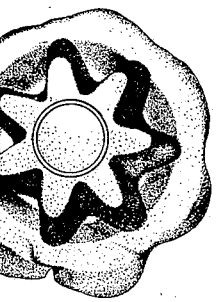
Figure 1 is a photographic view of the upset slug cut from bar stock from which the die-pressed gear of the invention is formed.

With continued reference to the drawings, in which like reference characters have been employed to designate similar parts throughout the several views thereof, the production of a differential bevel pinion has been chosen as a concrete example of the manner in which the invention is carried out, but it is to be understood that it is not limited thereto and may be successfully employed to produce bevel gears of larger sizes without departing from the spirit of the invention.

According to the invention, a piece of any suitable steel, preferably commercial rolled bar stock, in which the fiber or grain of the metal runs longitudinally of the bar, is subjected to a succession of forging and die-pressing steps to bring the gear into finished form, by gradually expanding it diametrically and reducing its thickness step-by-step, and during certain steps setting up a heavy pressure lengthwise of the teeth adjacent the tooth surfaces to cause the metal to closely conform to the die surfaces and produce dense, accurately contoured teeth. The final die-pressed gear produced by the method of the invention is so accurately formed that it is only necessary to carry out conventional hardening, machining and grinding operations to complete the gear.

By cutting off a slug of stock of a length to provide just sufficient excess metal to insure proper flow into the dies, it is possible to forge gears with materially less metal than that required to produce cut or generated gears. For instance, in producing the pinion chosen for illustration of the invention, a slug weighing .92 pound after die-pressing, machining, boring and finishing weighs .50 pound. The same gear, when cut from a forged blank, requires starting out with a blank weighing 1.65 pounds. A saving of approximately forty per cent is accordingly realized. The invention effects a saving of approximately fifty-five per cent in producing a somewhat larger gear than that illustrated.

The gear chosen for illustration of the invention is a differential pinion of the so-called "high traction" type, having seven teeth; a bevel angle of 30° 15'; a pitch of 3.27; a pressure angle of 25°; an overall axial length of .902 inch; an overall outside diameter 2.5 inches; a pitch cone of 2.125 inches; a pitch diameter of 2.141 inches; a root diameter of 1¼ inches; a smooth bore .876 inch in diameter; and a spherical back face having a radius of 2.249 inches. This pinion is adapted to be meshed with a differential side gear having twelve teeth; a bevel angle of 59° 45'; a pitch of 3.26; a pressure angle of 25°; an overall axial length of 1¾ inches; an overall diameter of 3.962 inches; a pitch cone of 2.125 inches; a pitch diameter of 3.671 inches; a root diameter of 3¼ inches and a splined bore.

The method will now be described, the steps being set forth in the order in which they are preferably carried out.

Referring to Figures 1 and 10, the slug cut from bar stock is upset in a press and brought into the form shown in these figures, the two dies being slightly concave.

Figure 2:
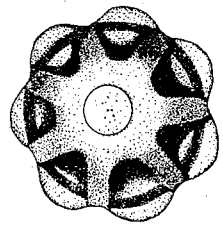
Figure 2 is a photographic view of the slug of Figure 1 as it appears after it has been forged into a blank of substantially pancake form.

The slug is then heated to about 2200 degrees Fahrenheit and is pressed into the "pancake" form shown in Figures 2 and 11 between mating cup-shaped dies, in a press known in the art as "Maxi-Press." The diameter of these dies is preferably such that the resulting pancake of Figures 2 and 11 has an overall diameter approximately one-half inch smaller than the overall diameter of the finished pinion, and approximately one-fourth inch thicker than the axial length of the finished pinion. It is important to start out with a blank bearing this relationship to the finished pinion so that in the subsequent forging steps the pinion may be successively compressed or diminished in thickness in an axial direction and gradually radially expanded or increased in diameter. This has been found to materially contribute to the formation of a highly desirable grain structure in the metal and a denser structure adjacent the periphery, which results in a gear having greater fatigue resistance and one which is stronger than gears produced by prior art methods. While we preferably employ a so-called Maxi-Press, because it is capable of delivering approximately eighty strokes per minute, it is to be understood that the invention is not limited thereto and other conventional vertical presses may be successfully employed to carry out the novel method.

Figure 3:
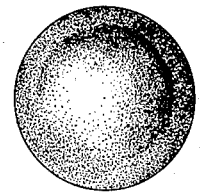
Figure 3 is a photographic view of the gear blank of Figure 2 at the end of the blocking impression or rough forging step.
Figure 19:
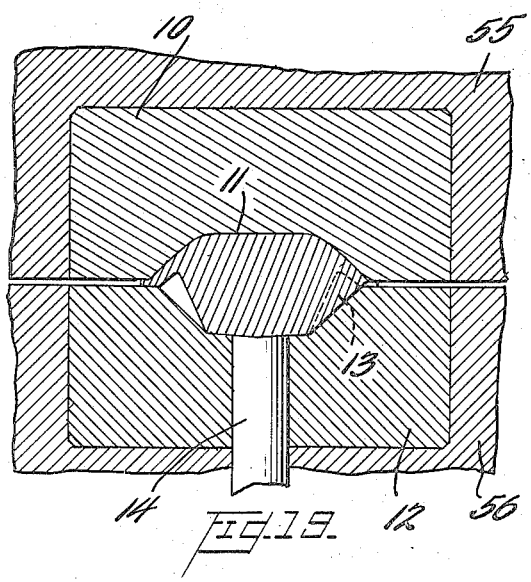
Figure 19 is a vertical, sectional view through a pair of dies employed to carry out one step of the invention, the blank being shown in place between the dies and assuming the shape shown in Figures 3 and 12, the gear teeth being only roughly forged in this step.

The pancake shaped blank of Figures 2 and 11 is then placed between the dies shown in Figure 19, and a blocking impression or rough forging made of the gear. This produces an initial flash around the edges of the gear approximately $\frac{3}{32}$ of an inch thick, outwardly of the tooth spaces. The blank at this stage of the process appears as shown in Figures 3 and 12, and is designated B in Figure 19. The rough formed teeth are shown in Figure 3, and the convex back of the gear in Figure 12.

As seen in Figure 19, the top die 10 has a cup-shaped face 11, ½ inch deep, for forming the back of the gear. The bottom die 12 is provided with tooth forming projections 13, which project $\frac{7}{16}$ inch above the die, and the depression has a depth of $\frac{9}{16}$ inch. In all of the pressing steps the tooth forming die is located at the bottom, so that in the forging operation the metal will be forced downwardly rather than upwardly, as in the conventional forging operation. This is important because the pinion may then be indexed through the various stages by placing it in the bottom forming die, the teeth of the latter automatically orienting the blank into the proper angular position, thus eliminating the possibility of ruining the teeth by the reciprocating die.

At the conclusion of pressing operation just described the blank is removed from the lower die by means of an ejector rod 14, in a manner well understood in this art. The dies of the foregoing forging step are preferably so dimensioned as to give the blank an overall diameter of 2$\frac{13}{16}$ inches. At the conclusion of this step the blank is therefore $\frac{11}{16}$ inch larger in diameter than the pancake of the preceding step and approximately 1/16 inch thinner (1 1/8 inches thick).

Figure 4:
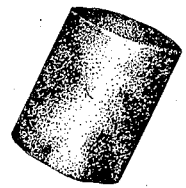
Figure 4 is a view similar to Figure 3, but illustrates the blank at the end of the finish-forge step.
Figure 20:
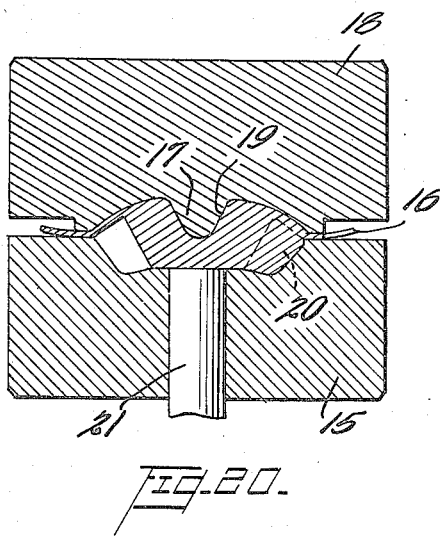
Figure 20 is a view similar to Figure 19, but illustrates the finish-forge dies with the blank between them, the blank being pressed to the shape shown in Figures 4 and 13 in this step.

In the next step of the process the forged blank B of Figures 3 and 12 is placed in the lower die 15 of the pair of dies shown in Figure 20, and pressed into the form shown in Figures 4 and 13. In this step the gear teeth are brought to approximate shape by deepening the spaces between them, and they are also made longer, the blank being expanded to an overall diameter, at the conclusion of this stage, to 2 11/32 inches. During this step a projection 17 on the top die 18, located in a cup-shaped recess 1 1/2 inch deep, punches a large central recess 19 in the top of the blank. The punching operation causes the metal to flow outwardly and assists in lengthening the gear teeth. In this step the tooth forming projections 20 project 5/8 inch above the face of die 15, and the depression has a depth of 1/16 inch. Also, during this step further flash is generated, as indicated at 16, being approximately 1/16 inch thick and forming webs between the teeth. At the conclusion of this step the blank has a thickness of approximately 1 1/32 inches, a decrease of 3/32 inch from the preceding step. The blank is then removed from the lower die by means of an ejector 21.

The gear blank may now be said to be completely or finish-forged. The flash is then trimmed off, the trimming operation preferably being carried out in the manner shown in Figure 25. The blank B is placed teeth down in a holder 23 and flash 16 is trimmed off by means of a trimming die 26, having a continuous cutting edge 27, conforming to the shape of the base of the gear, so that when the die is moved downwardly in the press, parallel to the axis of the gear, the flash is cut off in a single operation. The trimming die is preferably so dimensioned that the flash is cut off to form substantially parallel to the axis. As illustrated in Figure 26, these surfaces merge into the tooth faces 29 adjacent the heels of the teeth. A part of the metal underlying surfaces 28 is subsequently exuded from the gear as a further flash, while part of it is reformed into tooth surfaces, in the die-pressing operation that will now be described.

In the next step the blank is shot-blasted, preferably by 20 grain or like shot, for the purpose of removing part, and cracking up the remainder of the scale produced during the forging operation, so that it will be more susceptible to attack by the acid in a pickle bath. We have found that ten minutes of shot-blasting and fifteen minutes of pickling efficiently removes the scale, and at the same time the pickle does not work on the surface of the teeth.

Figure 5:
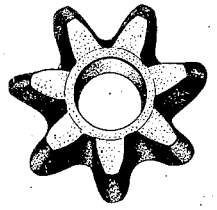
Figure 5 is a view similar to Figure 4, but shows the blank after the flash produced in the finish-forge step has been trimmed off and the gear has been shot-blasted to remove scale.

The shot-blasted and pickled blank is then heated to about 1400 degrees Fahrenheit to provide for easier flow of the metal in the subsequent die-pressing operations. The cold trimmed and cleaned blank appears as shown in Figures 5 and 14.

The teeth of the blank are now substantially in final form, except for a further slight lengthening of the teeth diametrically and a further slight chordal increase in thickness that is effected in the following die-pressing steps.

Figure 6:
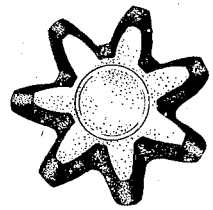
Figure 6 is a photographic view of the gear blank after it has been subjected to the semi-coin-pressing operation.
Figure 21:
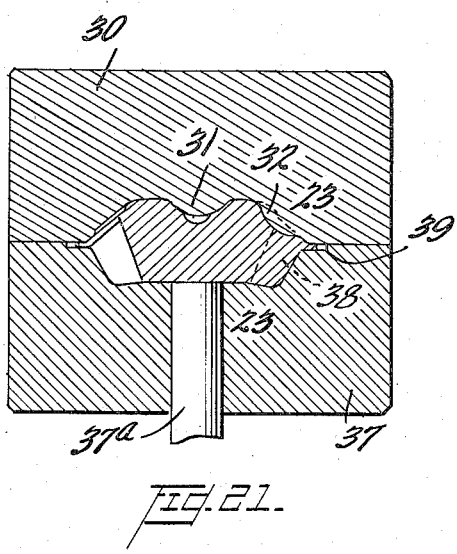
Figure 21 is a view similar to Figures 19 and 20, but illustrates the semi-coin-pressing dies, with the blank in place between them, the blank assuming the shape shown in Figures 6 and 15 in this step.

The blank is next given a semi-coining pass in the dies shown in Figure 21, to prepare it for the final coin-pressing operation. Inasmuch as the generation of flash is controlled in this step it may be termed a semi-coin-pressing operation. Referring to Figures 21 and 23, the top die 30 has a working surface which is of generally concave form, one-half inch deep, and has a central punch 31 and a radially elongated, convex boss or projection 32 for each gear tooth. Bosses 32 project 3/32 inch below the bottom of the flash groove in the lower die in the closed condition of the dies shown in these figures. Surrounding each projection 32, and conforming to the outline of the base of the gear teeth is a transversely concave groove 33 (Figure 23) preferably having a 3/32 inch radius, for the purpose of producing a convex bead 34 on each gear tooth. The latter extend around and merge into the depressions 35 produced by bosses 32. The lower die 37 has a toothed portion 38 formed by spaced depressions one-half inch deep. The bottom of the depression, which forms the toe of the gear tooth, is substantially the size and shape of the finished tooth. The side walls of the die teeth have a somewhat less degree of taper than the teeth of the final coin-pressing die 42 of Figure 24, forming a gear tooth which is approximately 1/16 inch (1/32 inch on a side) thinner than the finished tooth at the heel. A shallow marginal groove 39 (.062 inch deep) is provided into which the minor flash produced during this step of the operation is received. As seen in Figures 6 and 15, the flash is made up of a narrow band conforming to the outline of the teeth, and does not fill the space between the teeth, as does the flash of Figures 4 and 13. Inasmuch as groove 39 is closed when the dies are brought together, it controls the amount of flash generated in this step. However, the volume of the blank is usually such that the flash does not quite fill groove 39.

The central projection or punch 31 on the top die exerts a substantial radial outward pressure upon the metal which assists in forming the convex heads 34. In this step the gear is also further compressed in an axial direction (from 1 1/32 inches to 1 inch in thickness) and further increased in diameter, being expanded to its full external dimension of 2.5 inches. The tooth, however, although thickened at its heel by displacement of metal from depression 35, is 1/16 inch less than its finished thickness at the heel, and at its finished thickness at its toe. Also, the tooth is 1/16 inch longer than its finished length. The gear is removed from die 37 by an ejector 37a.

The foregoing step is extremely important to the success of the invention because it constitutes an essential preparatory step to the final coin-pressing operation, in which the gear teeth are brought into their ultimate form, and makes possible long serviceable life of the final coining dies. Of particular importance in this connection is the fact that the gear tooth is formed substantially to shape at the bottom or toe portion of the die making a solid base for the following step. As will be pointed out hereinafter, the half-round beads 34 provide metal for the base or heel of the teeth and also make it possible to develop strong longitudinal pressures throughout the length of the tooth faces, and a lower pressure interiorly of the tooth faces and bring about high density of the metal adjacent the tooth surfaces in the final gear. The depressions 35 provide spaces into which the excess metal can flow, transversely of the direction of pressure, thereby making it possible to use true coining dies in the final pressing step, and yet achieve a long useful die life.

Figure 22:
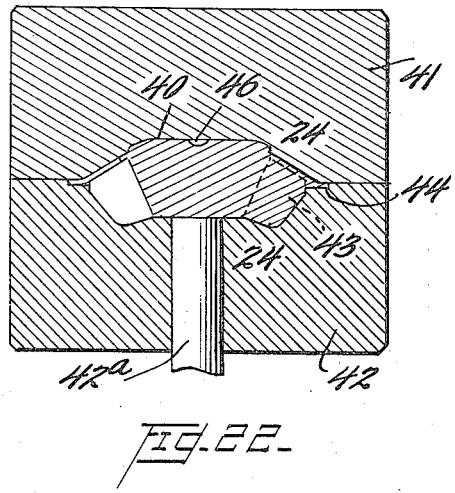
Figure 22 is a view similar to 21, but shows the finish coin-pressing dies with the finished blank between them, the blank being pressed to the shape shown in Figures 7 and 16 in this step.

In the next step the blank is placed between the dies 41 and 42 shown in Figure 22, and subjected to the final coin-pressing operation. Referring to Figure 29, in which the blank formed in the semi-coin-pressing step is shown in final coin-pressing die 42, the depressions between adjacent die teeth are of less depth than those of the die 37 and the toes of the teeth fit the bottom of these depressions, providing a solid base for the pressing step, while the gear tooth surfaces 29 incline upwardly and inwardly, away from the tooth forming surfaces of the die, the method preferably being carried out so that there is a space of approximately 1/32 inch therebetween at the heel of the teeth, as indicated at x, in Figure 29. When the blank is in place in die 42 as just described, the flash produced in the preceding step is spaced approximately 1/16 inch from the bottom of groove 44, as indicated by the reference character y in Figure 29.

The blank is now ready to have its axial thickness slightly decreased, and its teeth brought up to final thickness and contour in the final coin-pressing operation that will now be set forth.

Upper die 41 has a depth of one-half inch and a smooth face 40, conforming in general to the shape of the spherical back face of the finished gear. Lower die 42 has a central recess which is 1/16 inch deep and has a toothed portion 43 provided with accurately formed surfaces for imparting the exact final shape to the gear teeth. The lower die, adjacent the base of the teeth, is provided with a recess 44, which is somewhat shallower (.045 inch deep) than recess 39 of die 37, with the result that when the pressure is applied, the flash generated in the preceding step and the last phase of this step is firmly gripped between the dies and flattened out, and no opportunity is presented for exudation of the metal from the dies. In this step the blank is compressed to a thickness of 13/32 inch.

Referring to Figure 24, it will be observed that the beads 34 of the preceding step are completely flattened out into the plane of the rear face of the gear. This metal has filled out the gear teeth at the heel. The excess metal has flowed into recess 44 and space 35. A small depression 45 is left at the base of each tooth. The gear is removed from the lower die by an ejector rod 42a.

Figure 7:
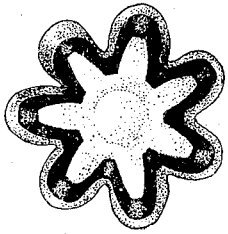
Figure 7 is a view similar to Figure 6, but shows the gear after it has been pressed to final form between the coin-pressing dies.

The gear at this stage of the process appears as seen in Figures 7 and 16. In Figure 16 are seen the shallow depressions 45 at the base of each tooth, and the depression 19 has been partially filled, leaving a small central depression 46.

We have found that by carrying out the invention in the manner just described, the deformation of the projections 34 formed on the blank in the preceding step is largely responsible for a material molecular consolidation or densification of the metal and ultimate strengthening of the teeth in the coining pass, because it results in heavy pressures being exerted longitudinally, substantially parallel with and adjacent to the stress receiving tooth surfaces throughout their length. This action, coupled with the fact that the teeth are tapered, results in materially increasing the density of the surface metal of the teeth throughout their length. While the dies completely confine the blank against extrusion of metal at any point, the depth of the depression 35 formed in the heel of each tooth prior to the final coining step result in lower pressures being developed interiorly of the teeth and provide spaces into which a part of the excess metal may flow inwardly, thereby materially reducing the wear and tear on the dies, while at the same time preventing the metal from flowing so freely as to prevent the generation of pressures of sufficient magnitude in the blank to cause the metal to flow laterally into intimate conformity with the surfaces of the dies.

We have found, by examining etched sections, that the gear produced in accordance with the invention is materially denser adjacent the surface of the teeth than the interior. This, coupled with the fact that the flow lines of the metal are parallel to the gear tooth surfaces, results in a materially superior gear, which is stronger and more resistant to fatigue than the generated or cut gears of the prior art.

In Figure 27 we have diagrammatically illustrated the flow lines appearing in a pinion made in accordance with the invention and is based on an etched section of a pinion at the conclusion of the semi-coin-pressing step of Figure 21. The flow lines or direction of the grain of the metal are designated by the dotted lines 51, and it is observed that they are disposed in substantially longitudinal parallelism with the gear teeth faces. This results from the fact that the grain in the bar stock, which is disposed longitudinally of the bar, is gradually worked outwardly during pressing of the blank and maintained substantially parallel to the tooth forming surfaces of the die. This method produces a materially stronger gear than one cut from bar stock, in which the grain runs exactly parallel to the gear axis.

The increased density of the gear adjacent the teeth faces is indicated by the closer spacing of lines 51. This, as previously pointed out, is due to the progressive expansion of the blank outwardly into intimate conformity with the die incident to the gradual compression or thinning of the blank in an axial direction, and to the beads 34 setting up heavy localized pressures adjacent to, and lengthwise of the tapered teeth when the blank is pressed in dies 41 and 42. Examination of etched sections of gears cut from bar stock by prior art methods shows uniform, comparatively low density of the metal from the core to the tooth surfaces.

The blank is then cold trimmed by means of a die similar to the one shown in Figure 25, and having a peripheral cutting edge moving substantially parallel to the axis of the gear, so as to cut the base of the tooth slightly back of the working faces of the teeth. It should be observed that by so forming the dies as to produce a substantially flat flash, located adjacent the heels of the teeth, and cutting off the flash with a die in a single operation, the flash problems of the forging methods heretofore proposed have been completely eliminated.

In the next step the blank is blast cleaned with very fine grit, so as to remove part of the scale and loosen up the remainder, and the blank is then pickled in a manner similar to that employed after the finish-forge step, previously described.

Figure 8:
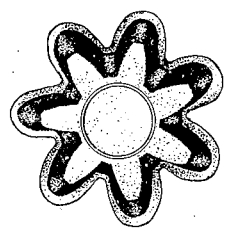
Figure 8 shows the blank of Figure 7 after it has been cold-trimmed and shot-blasted.

In the next step the gear is subjected to a final tooth finishing operation, which removes or levels off any minute projections left on the tooth surfaces at the conclusion of the final coin-pressing operation. This is carried out by forcing the cold gear blank into a planishing die a distance of approximately 1/32 inch after contact of the surfaces is made. The planishing die has extremely accurately formed smooth surfaces, conforming to the shape of the finished gear, and while it somewhat resembles the lower dies of the other steps, it is provided with a positive bottom at the toe end of the teeth, so that when pressure is applied in the press, axial movement of the gear into the die is limited. The smooth faces of the planishing die, under the influence of the heavy axial pressure, refine the working faces of the gear teeth into smooth surfaces. This causes any minute projections, which may have been left on the surfaces as a result of scale and pickling, to be smoothed off and brought into the plane of the gear teeth, and insures a long life gear. At the conclusion of the operation just described, the blank appears as shown in Figures 8 and 17.

The next step is drilling the bore in the blank, which is carried out in any desired manner, locating from the pitch line of the teeth.

The blank is then reamed and a spherical face formed on the back. A chamfer hole also is made adjacent the bore at the back, these operations being carried out locating from the pitch line of the teeth. We have found it convenient to carry out the boring, reaming and spherical facing in a single operation in a turret lathe, but any well known method may be used.

In the next step the pinion is spot-faced in a drill press in well known manner.

The gear is then hardened and drawn as follows:
1. Carburized at 1725 degrees Fahrenheit.
2. Quenched in oil—temperature approximately 115-120 degrees Fahrenheit.
3. Reheated to approximately 400 degrees.
4. Quenched in oil, same temperature as first quench.
5. Washed and drawn at 350 degrees for approximately one hour.
6. Rough shot blasted.

The next step is to grind the bore, again locating from the pitch line of the teeth. The spherical radius is then ground, which brings the gear "on cone."

Figure 9:
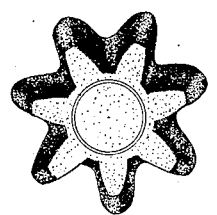
Figure 9 is a view showing the finished gear.

The gear is now completely finished, and aside from the shallow depressions in the heels of the teeth, and the narrow trimmed surface at the base of the gear teeth, as seen in Figures 9 and 18, appears substantially the same as a gear cut or generated by prior art methods. The reduction in effective tooth length resulting from formation of the trimmed surface is small, and the gear has been found to stand up materially better than those of the prior art despite the minor reduction in working tooth surface.

We have found that as a result of pressing the metal in the successive steps the method of the invention imparts an improved grain line structure to the gear adjacent the teeth, as well as increases the density of the gear adjacent the tooth surfaces. This results in a gear which is materially stronger, and has greater fatigue resistance than a gear generated by prior art methods. The novel method also achieves savings in material ranging from approximately forty-five per cent on small pinions of the character shown in the drawings, to fifty-five per cent and more on larger pinions. Further economies in time and labor are realized over the generated pinions of the prior art because a worker can turn out materially more gears by the novel die-pressing operation here disclosed than with conventional tooth generating machines. We have found that a comparatively high volume of work can be turned out by manually transferring the blanks from one die to another, and by employing an automatic indexing or transferring mechanism (not shown) the production rate can be materially increased.

A further advantage of the invention resides in the fact that by forging the gear to final form it is possible to join the teeth to the gear body with a materially larger fillet than is possible by conventional gear cutting or generating methods, and which adds to the strength of the finished gear.

As seen in Figure 28, the working face 29 of the tooth illustrated joins the body of the gear along a smooth, large radius fillet 53, while the dotted line shows the abrupt, short radius fillet 54 of a gear of comparable size but produced by cutting methods of the prior art.

It is to be understood that conventional contour and dimension checking methods may be employed to check the accuracy of the die-pressing operations as well as the finished gear, and a showing of them has been omitted to simplify the disclosure.

We have also found it important to the commercial success of the invention to tightly confine each of the dies in a relatively massive re-enforcing cylinder or cup-shaped support, two of them being shown in part in Figure 19 and designated 55 and 56. These supports re-enforce the dies against splitting or spreading under the pressure to which they are subjected during forging of the gear. An opening 57 is provided in support 56 through which rod 14 reciprocates to eject the blank at the conclusion of the forging operation. Similar pairs of supports are preferably associated with the other dies, but have not been illustrated, as the manner in which they are associated with the dies is the same as those shown in Figure 19.

The re-enforcing members preferably have a diameter approximately twice the diameter of the dies, and an axial length two or three times that of the dies so as to afford comparatively massive re-enforcement. Also, the dies are pressed into the supports, so that the latter exert initial strong inwardly directed confining forces upon the dies.

We have found that by re-enforcing the dies as just described, carrying out the die-pressing operation in several steps, and forming recesses in the blank in certain steps, into which excess metal may flow in subsequent steps, the forging dies have a useful life of from ten to twelve thousand passes, and the coining dies (30, 37, 41 and 42) have a useful life of from eighteen to twenty thousand passes.

It will be seen that, by means of our present invention, we have succeeded in producing a gear of the bevel type from low cost, commercial metal stock having comparable physical properties and wear resisting qualities in the teeth thereof to similar gears as heretofore produced from more expensive, close-grained metal stocks by machine cutting or grinding. Also, in comparison with the latter, relatively low production costs of our new gear are realized by a die forging method which may be expeditiously carried out with a minimum of wear upon the several parts of the apparatus employed. This method, in its essentials, is characterized by the serial application of pressures, in a plurality of forging dies of relatively different structural forms, to the metal blank, so that in the respective pressure applications different parts of the blank will be subjected to pressures which differ in magnitude, to thereby effect a redistribution of the original coarse-grained molecular structure of the blank, whereby a final finished gear having the desired physical characteristics is produced.

From the foregoing detailed disclosure it is apparent that the invention provides a novel method of making gears, by subjecting a length of commercial bar stock to a succession of forging and coin-pressing operations, in which the blank is gradually reduced in thickness and increased in diameter, and the metal is caused to flow into intimate conformity with the die surfaces and at the same time is subjected to a densifying action throughout the length of the teeth, and which, when pressed in a planishing die requires no further tooth finishing; that the gear so produced is materially stronger and has greater fatigue resistance than the cut or generated gears of the prior art and at the same time has teeth whose surfaces are formed with comparable accuracy, and that the invention provides certain novel methods for making gears and the like.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A forged gear having smooth pressed exterior tooth surfaces, the metal at and adjacent the surfaces of each tooth being denser than the interior of said tooth and shallow recesses in each tooth at the back of the gear.

2. In a method of making a bevel gear of desired tooth form from a gear roughly approximately the desired shape and size, the steps of subjecting said gear to a die pressing operation wherein surface depressions are formed in the heel of each tooth so as to flow metal therefrom toward the tooth profile and thereby thicken the heel of said tooth while forming an upstanding bead of metal on said heel surface extending substantially coextensively and adjacent each tooth profile, and then subjecting said gear to a further die pressing operation wherein each said bead is substantially flattened forcing metal therefrom into the heel of the associated tooth to fill out the heel of the teeth to substantially final form, some excess metal from each bead not required to fill out the tooth heel being forced outwardly as limited flash and the remainder being caused to flow inwardly back into said depressions.

3. In a method of making a bevel gear of desired tooth form, the steps of providing a roughly forged gear of approximately desired shape and size, subjecting the heel of each tooth to a die pressing operation wherein metal is caused to flow outwardly from a surface depression in each tooth and is formed as an upstanding rib about said depression and generally paralleling the profile of each gear tooth, and then subjecting said gear to a further die pressing operation wherein metal from each said rib is caused to flow downwardly and outwardly to fill out the tooth to desired thickness at the heel, some excess metal from each rib flowing outwardly as controlled flash and the remainder flowing inwardly back to said depressions.

4. The method of making a bevel gear which comprises the steps of providing a roughly forged gear of approximate size and shape, subjecting said gear to a die pressing operation wherein metal at the heel of each tooth is caused to flow outwardly with controlled flash so as to form a rib of metal generally coextensive with the tooth profile, and subjecting said gear to a further die pressing operation wherein metal from said rib is caused to flow to fill out the tooth form while controlling the amount of flash around the gear, remaining excess metal from the rib being returned inwardly to the depression originally formed by said outward flow.

5. The method of die pressing gears, which comprises forging a billet step by step into the rough shape of the desired gear by a succession of operations, forming a rib generally paralleling the form of each gear tooth and a recess within the rib in the heel of each tooth of the partially formed gear in a further operation, and then completing the gear to final tooth form by a coin pressing operation flattening said ribs and thickening the teeth at the heel while controlling the amount of metal as a flash around the back ends of said gear teeth and causing remaining excess metal from the ribs to flow back into said recesses.

ROWLAND J. GOLDIE.
CARL L. WILBER.